US005536939A

United States Patent [19]

Freidhoff et al.

[11] Patent Number: 5,536,939

[45] **Date of Patent: * Jul. 16, 1996**

[54] MINIATURIZED MASS FILTER

[75] Inventors: Carl B. Freidhoff, Murrysville; Robert M. Young, Pittsburgh, both of Pa.

[73] Assignee: Northrop Grumman Corporation, Los Angeles, Calif.

[ * ] Notice: The term of this patent shall not extend beyond the expiration date of Pat. No. 5,386,115.

[21] Appl. No.: 320,474

[22] Filed: Oct. 7, 1994

Related U.S. Application Data

[63] Continuation-in-part of Ser. No. 124,873, Sep. 22, 1993, Pat. No. 5,386,115.

[51] Int. Cl.[6] .............................. B01D 59/44; H01J 49/00

[52] U.S. Cl. .............................. 250/281

[58] Field of Search .............................. 250/281, 282, 250/296, 299, 300

[56] References Cited

U.S. PATENT DOCUMENTS 3,955,084 5/1976 Giffin .............................. 250/281
4,924,090 5/1990 Wollnik et al. .............................. 250/296
5,386,115 1/1995 Freidhoff et al. .............................. 250/281

OTHER PUBLICATIONS

H. H. Bauer et al., "Instrumental Analysis", (1978), pp. 443–459.

*Primary Examiner*—Bruce C. Anderson

[57] ABSTRACT

A mass filter is provided for use in a solid state mass spectrograph for analyzing a sample of gas. The mass filter is located in a cavity provided in a semiconductor substrate. The mass filter generates an electromagnetic field in the cavity which filters by mass/charge ratio an ionized portion of the sample of gas. The substrate has an inlet through which the gas to be analyzed flows through prior to reaching the mass filter. The mass filter can be either a single-focussing Wien filter or magnetic sector filter or can be a double-focussing filter which uses both an electric field and a magnetic field to separate the ions.

13 Claims, 6 Drawing Sheets

FIG. 7
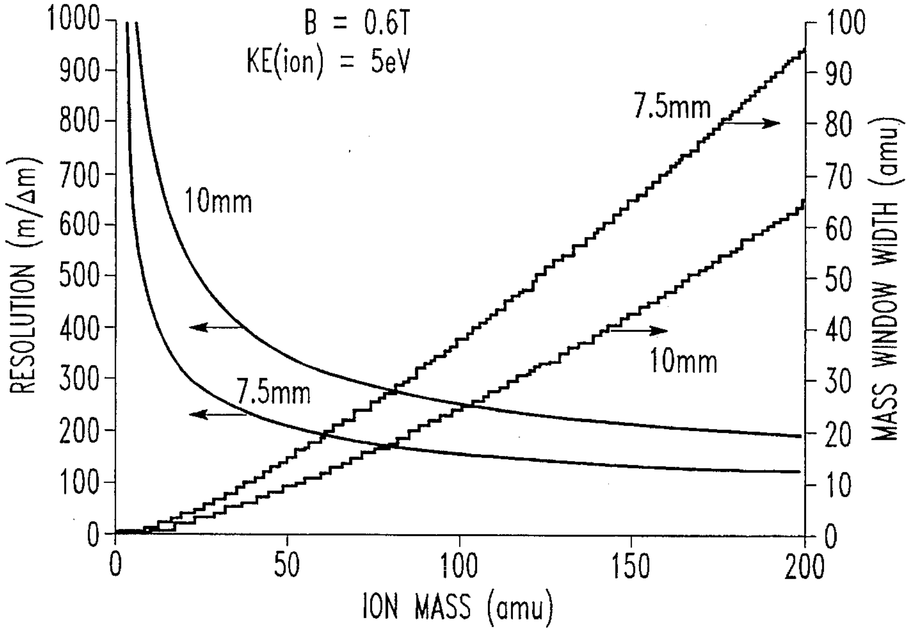
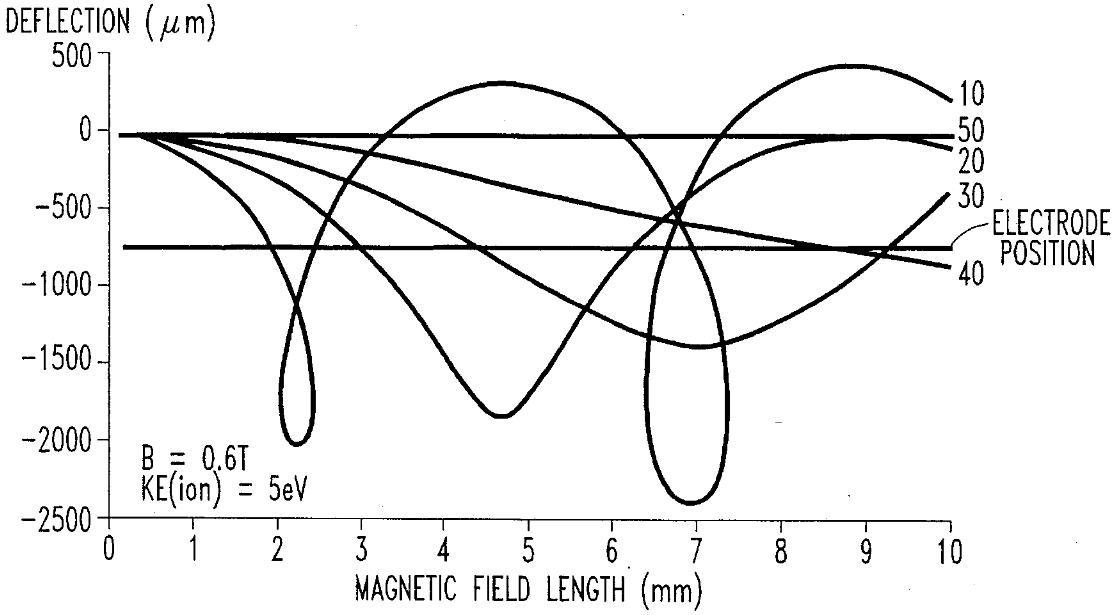
FIG. 8

FIG. 9a
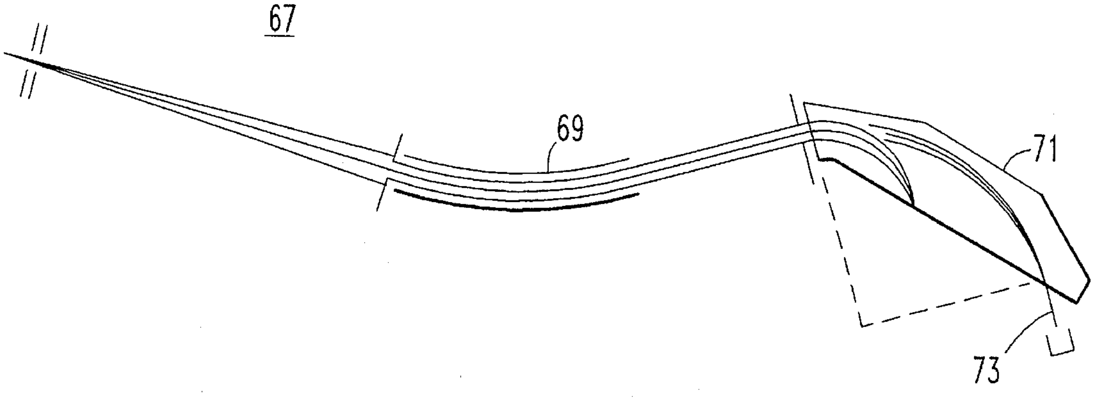
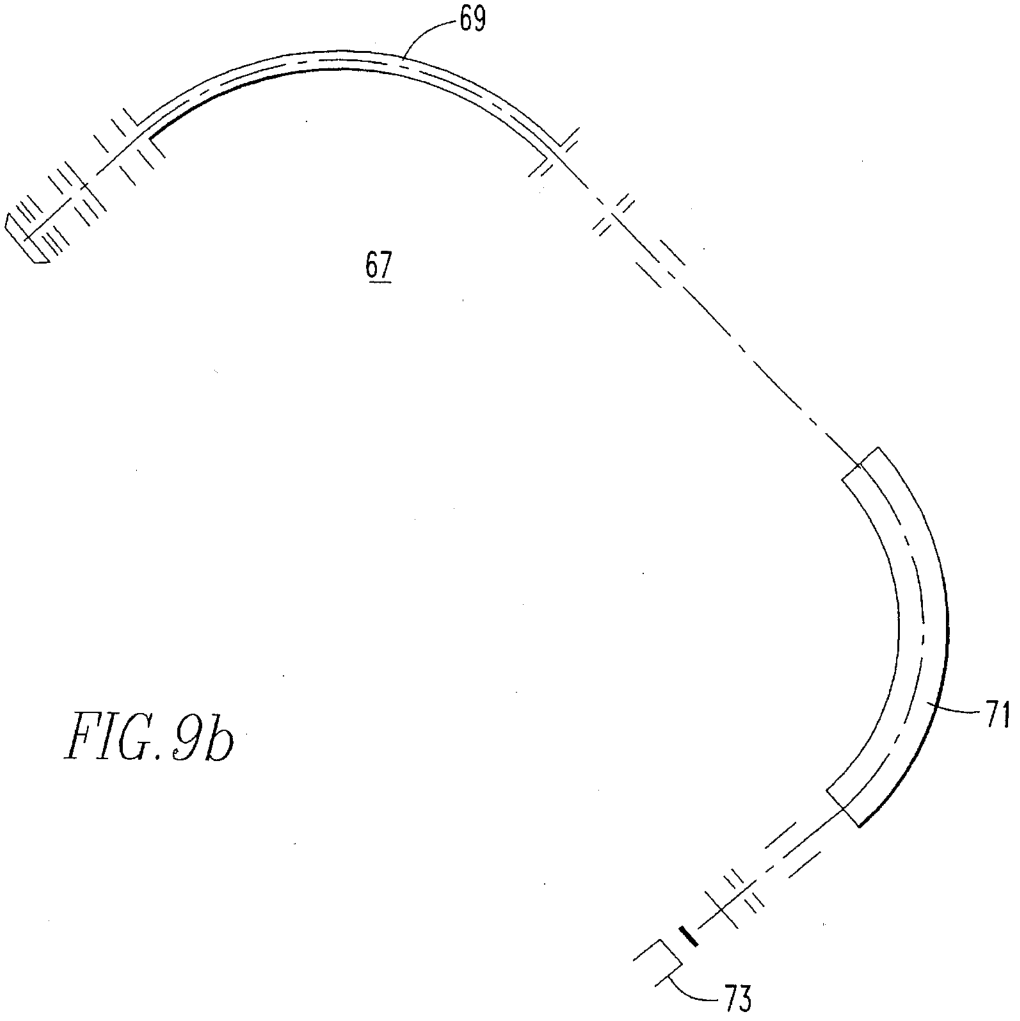
FIG. 9b

MINIATURIZED MASS FILTER

GOVERNMENT CONTRACT

The government of the United States of America has rights in this invention pursuant to Contract No. 92-F-141500-000, awarded by the United States Department of Defense, Defense Advanced Research Projects Agency.

CONTINUING APPLICATION

This application is a continuation-in-part of application Ser. No. 08/124,873, filed Sep. 22, 1993, now U.S. Pat. No. 5,386,115.

BACKGROUND OF THE INVENTION

1. Field of the Invention

This invention relates to a gas-detection sensor and more particularly to a solid state mass spectrograph which is micro-machined on a semiconductor substrate, and, even more particularly, to a mass to charge ratio filter for ion separation in the mass spectrograph.

2. Description of the Prior Art

Various devices are currently available for determining the quantity and type of molecules present in a gas sample. One such device is the mass-spectrometer.

Mass-spectrometers determine the quantity and type of molecules present in a gas sample by measuring the mass-to-charge ratio and quantity of ions formed from the gas through an ionization method. This is accomplished by ionizing a small sample and then using electric and/or magnetic fields to find a charge-to-mass ratio of the ion. Current mass-spectrometers are bulky, bench-top sized instruments. These mass-spectrometers are heavy (100 pounds) and expensive. Their big advantage is that they can be used to sense any chemical species.

Another device used to determine the quantity and type of molecules present in a gas sample is a chemical sensor. These can be purchased for a low cost, but these sensors must be calibrated to work in a specific environment and are sensitive to a limited number of chemicals. Therefore, multiple sensors are needed in complex environments.

A need exists for a low-cost gas detection sensor that will work in any environment. U.S. patent application Ser. No. 08/124,873, filed Sep. 22, 1993, U.S. Pat. No. 5,386,115, hereby incorporated by reference, discloses a solid state mass-spectrograph which can be implemented on a semiconductor substrate. FIG. 1 illustrates a functional diagram of such a mass-spectrograph 1. This mass-spectrograph 1 is capable of simultaneously detecting a plurality of constituents in a sample gas. This sample gas enters the spectrograph 1 through dust filter 3 which keeps particulate from clogging the gas sampling path. This sample gas then moves through a sample orifice 5 to a gas ionizer 7 where it is ionized by electron bombardment, energetic particles from nuclear decays, or in electrical discharge plasma. Ion optics 9 accelerate and focus the ions through a mass filter 11. The mass filter 11 applies a strong electromagnetic field to the ion beam. Mass filters which utilize primarily magnetic fields appear to be best suited for the miniature mass-spectrograph since the required magnetic field of about 1 Tesla (10,000 gauss) is easily achieved in a compact, permanent magnet design. Ions of the sample gas that are accelerated to the same energy will describe circular paths when exposed in the mass-filter 11 to a homogenous magnetic field perpendicular to the ion's direction of travel. The radius of the arc of the path is dependent upon the ion's mass-to-charge ratio. The mass-filter 11 is preferably a Wien filter in which crossed electrostatic and magnetic fields produce a constant velocity-filtered ion beam 13 in which the ions are disbursed according to their mass/charge ratio in a dispersion plane which is in the plane of FIG. 1.

A vacuum pump 15 creates a vacuum in the mass-filter 11 to provide a collision-free environment for the ions. This vacuum is needed in order to prevent error in the ion's trajectories due to these collisions.

The mass-filtered ion beam is collected in an ion detector 17. Preferably, the ion detector 17 is a linear array of detector elements which makes possible the simultaneous detection of a plurality of ions formed from the constituents of the sample gas. A microprocessor 19 analyses the detector output to determine the chemical makeup of the sampled gas using well-known algorithms which relate the velocity of the ions and their mass. The results of the analysis generated by the microprocessor 19 are provided to an output device 21 which can comprise an alarm, a local display, a transmitter and/or data storage. The display can take the form shown at 21 in FIG. 1 in which the constituents of the sample gas are identified by the lines measured in atomic mass units (AMU).

Preferably, mass-spectrograph 1 is implemented in a semiconductor chip 23 as illustrated in FIG. 2. In the preferred spectrograph 1, chip 23 is about 20 mm long, 10 mm wide and 0.8 mm thick. Chip 23 comprises a substrate of semiconductor material formed in two halves **25*a* and 25*b* which are joined along longitudinally extending parting surfaces 27*a* and 27*b*. The two substrate halves 25*a* and 25*b* form at their parting surfaces 27*a* and 27*b* an elongated cavity 29. This cavity 29 has an inlet section 31, a gas ionizing section 33, a mass filter section 35, and a detector section 37. A number of partitions 39 formed in the substrate extend across the cavity 29 forming chambers 41. These chambers 41 are interconnected by aligned apertures 43 in the partitions 39 in the half 25*a* which define the path of the gas through the cavity 29. Vacuum pump 15 is connected to each of the chambers 41 through lateral passages 45 formed in the confronting surfaces 27*a* and 27*b*. This arrangement provides differential pumping of the chambers 41** and makes it possible to achieve the pressures required in the mass filter and detector sections with a miniature vacuum pump.

One of the methods utilized to determine the nature of a molecular species is to determine its molecular weight. This is not a unique property of a molecule, since the same set of atoms which constitute a molecule can be bonded together in a variety of ways to form molecules with differing toxicities, boiling points, or other properties. Therefore, in order to uniquely identify a particular molecular compound, the structure must be identified. A well-established technique for determining the molecular structure of molecules is the dissociative ionization of molecules and then determining the quantity and mass to charge ratio of the resulting ion fragments, also known as the cracking pattern. The general technique is referred to as mass spectroscopy.

To determine the mass to charge ratio of an ion, a variety of methods are utilized which causes a separation of the ions either by arrival at a detector over a period of time, or by causing a physical displacement of the ions. The number of detectors simultaneously used determines the speed and sensitivity of the device. Techniques which scan the ion beam over a single detector are referred to as mass-spectrometers and those which utilize multiple detectors simultaneously are referred to as mass-spectrographs. Mass-spectrographs can also be scanned by utilizing an array which covers a subset of the full range of mass to charge ratios; scanning multiple subsets allows coverage of the entire mass range. In order to provide a micro-miniature mass spectrograph, there is a need for a micro-miniature mass separator which can be used in that micro-miniature mass-spectrograph.

SUMMARY OF THE INVENTION

In order to utilize a detector array, displacement of the various mass to charge ratio ions in space is conventionally used. Time of flight methods which separate the ions by arrival time at a detector are typically single detector spectrometers. For the present invention, physical separation in space is utilized in order to take advantage of the additional sensitivity gains through integration on an array. Typically, magnetic and/or electrostatic fields can be utilized to cause a separation of the ions in space. Constant magnetic and electrostatic fields cause a fanning of ions in physical space and are amenable to the incorporation of detector arrays.

The mass filter of the present invention is provided for use in a solid state mass spectrograph for analyzing a sample of gas. The mass filter is located in a cavity provided in a semiconductor substrate. The mass filter generates an electromagnetic field in the cavity which filters by mass/charge ratio an ionized portion of the sample of gas. The substrate has an inlet through which the gas to be analyzed flows through prior to reaching the mass filter. The mass filter can be either a single-focussing Wien filter or magnetic sector filter or can be a double-focussing filter which uses both an electric field and a magnetic field in two different regions of the ion trajectories to separate the ions.

BRIEF DESCRIPTION OF THE DRAWINGS

A full understanding of the invention can be gained from the following description of the preferred embodiments when read in conjunction with the accompanying drawings in which:

FIG. 7 is a graph showing the relationship of the resolution and mass window width to the ion mass for the mass filter of FIGS. 4, 5 and 6 for a device with scanned electrostatic field and permanent magnetic field.

FIG. 8 is a graph illustrating the relationship of the filter width in eliminating cycloidal trajectories in the mass filter of FIGS. 4, 5 and 6.

FIGS. *9a* and *9b* are schematic drawings of a third presently preferred embodiment of the mass filter of the present invention.

DETAILED DESCRIPTION OF THE PREFERRED EMBODIMENTS

Three embodiments of the present separator are provided which are miniaturizable and can cause displacements of ion beams by tens of micrometers. These separators can be incorporated into a micromachined device with photolithographically defined detectors to provide a small, compact gas sensor. The three embodiments of mass filter 11 are the magnetic sector shown in FIG. 3, the Wien filter shown in FIGS. 4 and 5, and the double-focussing filter shown in FIGS. *9a* and *9b*. In all three embodiments, the mass filter 11 is located at the mass filter section 35 of the cavity 29 shown in FIG. 2.

Magnetic fields have been widely utilized to separate ions according to their mass to charge ratio. The separation is accomplished by passing a monoenergetic ion beam with a defined cross section between the poles of a magnet in a collisionless environment. The interaction of the ion current with the magnetic field imparts a force perpendicular to the ion's velocity and the magnetic field lines which is proportional to the product of the ion's velocity and magnetic field strength, as represented in the Maxwell's equation:

$$F = q * (v \times B),$$

where F is the force vector, q is the charge possessed by the ion, v is the velocity vector of the ion and B is the magnetic field vector. If the ions are entering the magnetic field monoenergetically, then the velocity of the ion is proportional to the mass of the ion for singly charged ions by the relationship:

$$v = [2 * q * K/m]^{0.5},$$

where v is the velocity vector, K is the kinetic energy of the singly charged ion and m is the mass of the ion. For multiple charged ions, q, the charge on the ion enters both relationships as shown.

A combination of the two relationships and the use of uniform magnetic fields show that the ions describe circles based on their mass to charge ratio. The circular trajectories for a 90 degree sector magnet design is:

$$r = q * B/(m * v),$$

where r is the radius which an ion having a charge, q, mass, m, and velocity, v, will describe in a uniform magnetic field, B. This results in a physical displacement of the ion according to its mass to charge ratio, and an array can be utilized to collect the dispersed ion spectrum. This system can also be scanned by changing the magnetic field or the energy of the ions.

Figure 3:
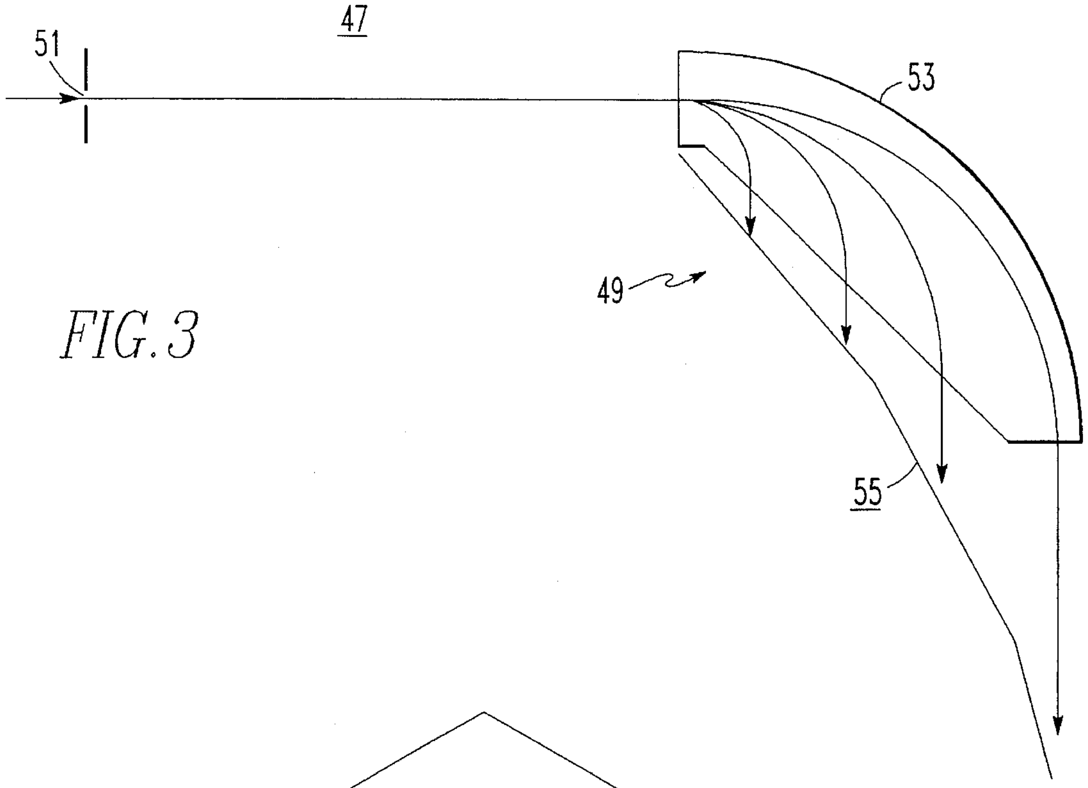
FIG. 3 is a schematic drawing of a first presently preferred embodiment of the mass filter of the present invention.

A schematic of a magnetic sector mass filter 47 is shown in FIG. 3. The detector array 49 is situated perpendicular to the input 51 of the ion beam direction for this 90 degree sector system. The detector array 49 is situated on a line which is slanted relative to the magnet pole face 53 due to the focussing properties of the magnetic field. The ion detectors 55 should be placed along the focal plane in order to take advantage of the focussed ion beams to obtain highest resolution for the system.

The mass range of the magnetic sector type filter 47 is limited by the magnetic field strength and the length of the pole face 53 in which the ions can interact. Due to the small gaps obtainable in a micromachined system, high magnetic fields can be generated from permanent magnet materials. Mean free path is also a consideration. In order to maintain a collisionless environment, the mass filter 47 is typically evacuated to low pressures. To obtain a mean free path of one centimeter, pressures must be below $1\times10^{-2}$ Torr. One centimeter for the mass filter is a reasonable size to incorporate in a silicon microelectronic fabrication. With this size limitation, ion energies between 1 and 10 electron volts, and magnetic field strengths of up to 0.8 Tesla, the mass range of a magnetic section mass filter 47 is from 1 amu to approximately 300 amu. The resolution of such a system would be 1 amu at 300 amu. Higher ion energies allow the system to scan wider ranges.

The magnetic sector type mass filter 47 is an embodiment for a micro-miniature mass-spectrograph 1 which can be fabricated with standard silicon photolithographic techniques. This enables miniaturization and low power to expand sensing applications using mass spectrometry techniques. For high temperature applications, silicon carbide can be utilized as an appropriate substrate, as well as other etchable or machinable glasses and ceramics.

Figure 4:
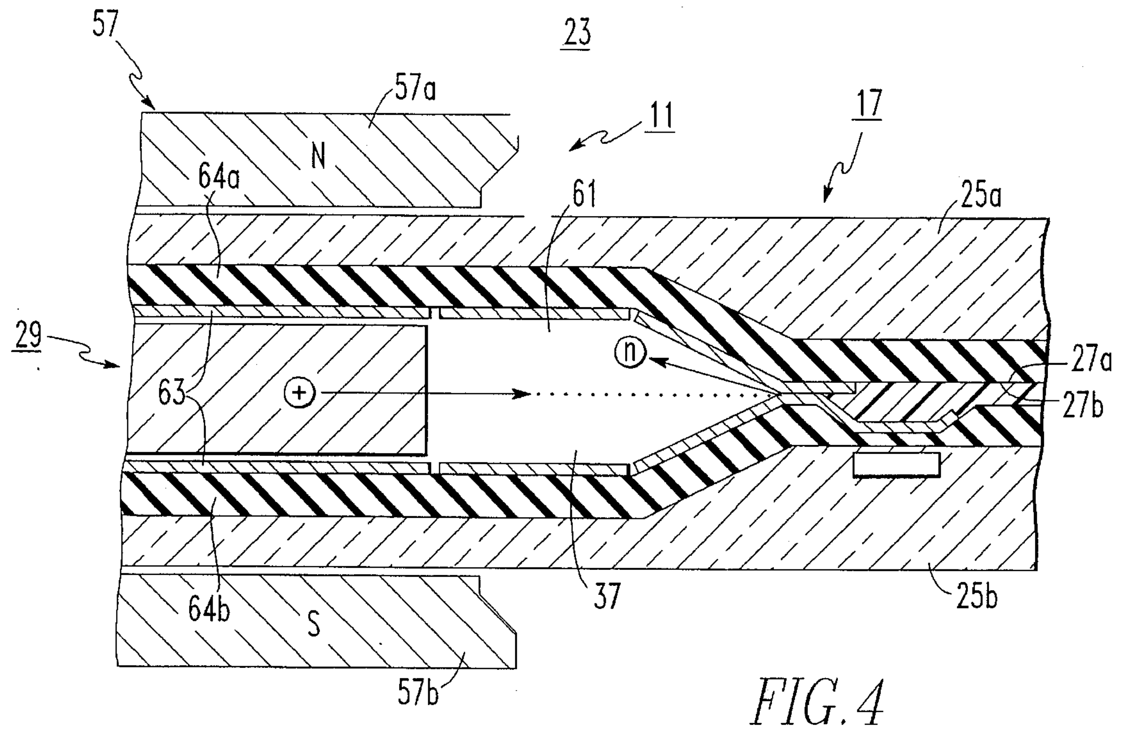
FIG. 4 is a longitudinal fractional section through a portion of the mass-spectrograph of FIGS. 1 and 2 showing a second presently preferred embodiment of the mass filter of the present invention.
Figure 5:
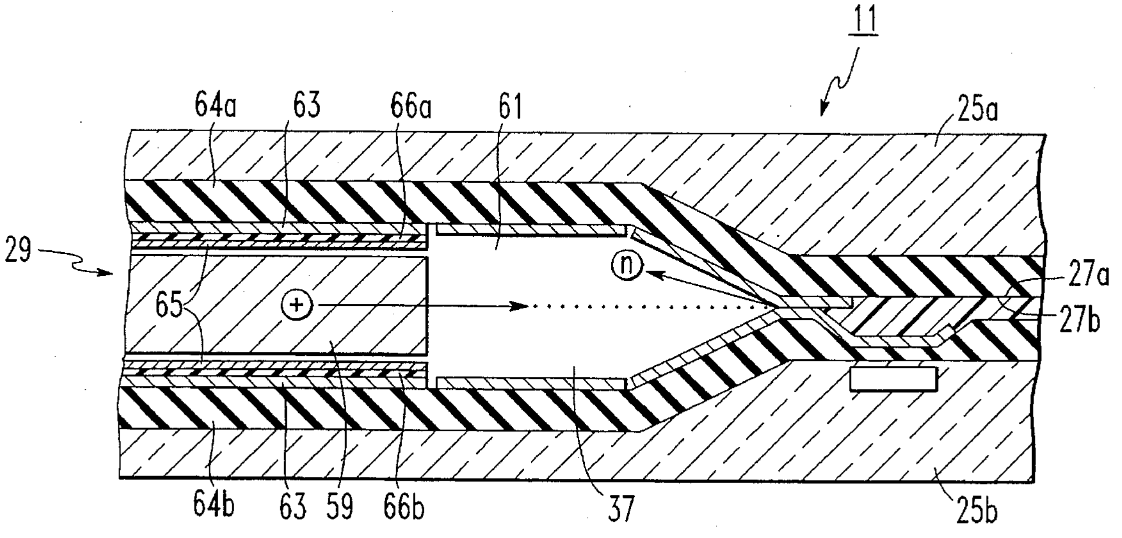
FIG. 5, which is similar to FIG. 4, illustrates a variation of the embodiment of FIG. 4.

A more compact mass filter, known as a Wien filter and shown in FIGS. 4 and 5, can be achieved by placing a uniform electrostatic field perpendicular to both the ion velocity vector and the magnetic field. The electrostatic field can be polarized in this situation so that the force exerted by the electrostatic field opposes that exerted by the interaction of the ion current and the magnetic field. The force on the ion follows the relationship:

$$F=q^*E+q^*(v\times B),$$

where F is the force vector, q is the charge on the ion, E is the electrostatic field vector, v is the velocity vector of the ion and B is the magnetic field vector. For monoenergetic ions and uniform fields, this causes one ion to travel down the centerline of the filter undeflected with ions traveling slower fanned to one side of the centerline and those traveling faster to the other side. This permits a straight through system to be fabricated with the ion detection array at the end of the chamber, rather than on the wall perpendicular to the initial ion trajectory before it enters the mass filter.

Figure 1:
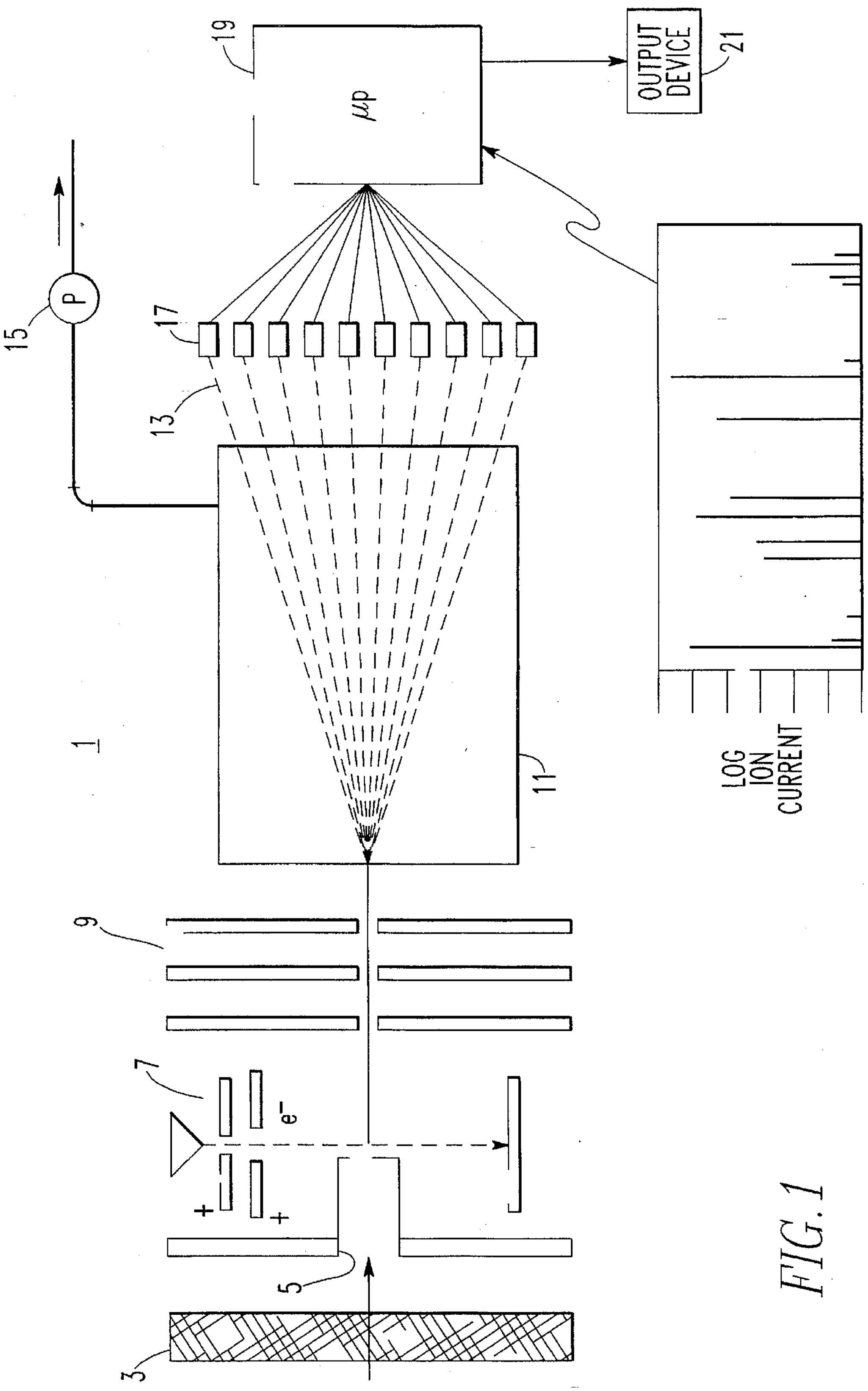
FIG. 1 is a functional diagram of a solid state mass-spectrograph in accordance with the invention.
Figure 2:
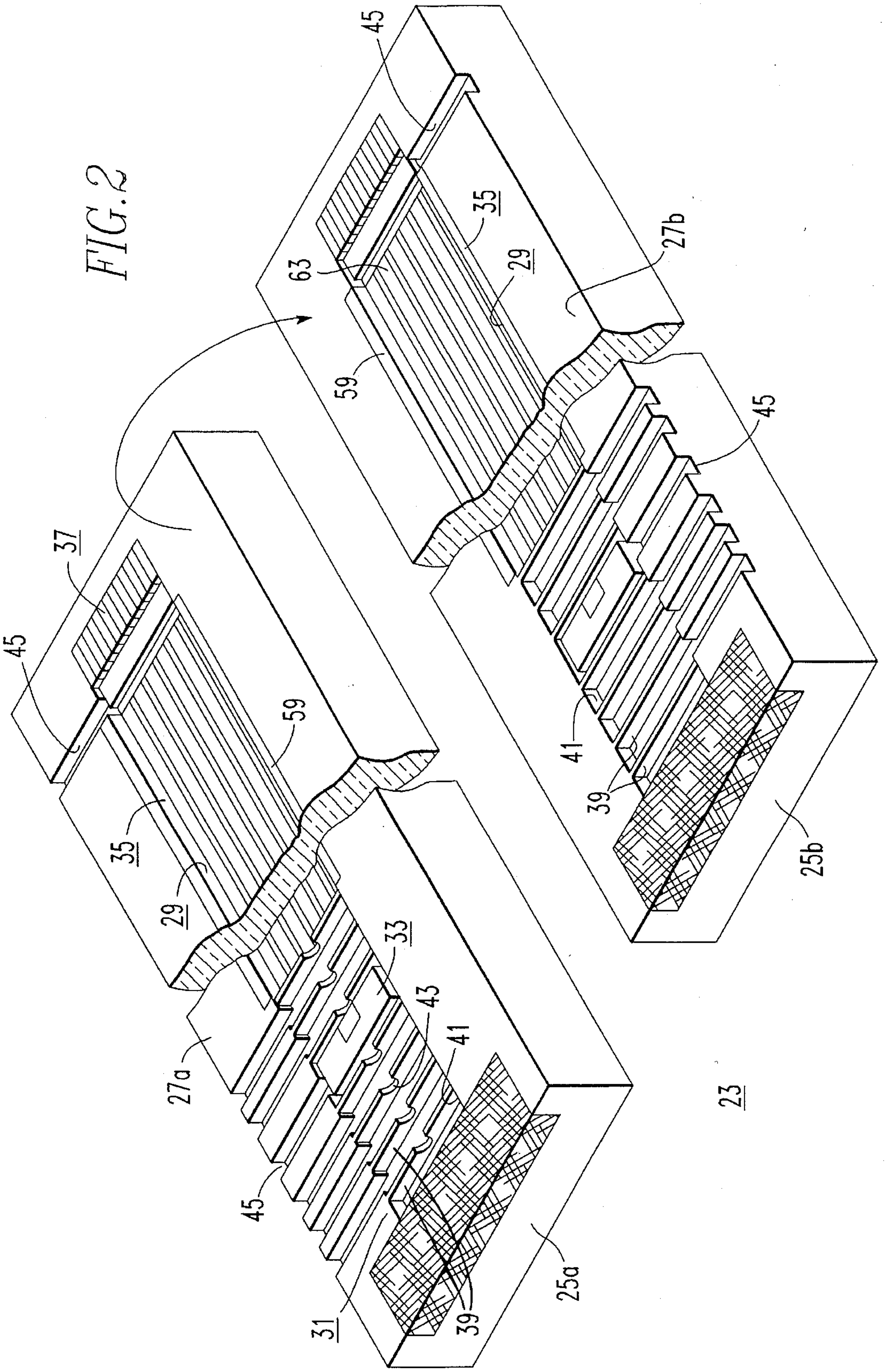
FIG. 2 is a isometric view of the two halves of the mass-spectrograph of the invention shown rotated open to reveal the internal structure.

The preferred embodiment of the Wien filter utilizes a permanent magnet 57 which reduces power consumption. As shown FIG. 4, this permanent magnet 57 has upper and lower pole pieces **57*a* and 57*b* which straddle the substrate halves 25*a* and 25*b* and produce a magnetic field which is perpendicular to the path of the ions. The orthogonal electric field for the Wien filter is produced by opposed electrodes 59 formed on the side walls 61 of the mass filter section 35 of the cavity 29. As shown in FIGS. 2 and 4, additional pairs of opposed trimming electrodes 63 are spaced along the top and bottom walls of the mass filter section 35 of the cavity 29. A spectrum of voltages is applied to these additional electrodes to make the electric field between the electrodes 59 uniform. These additional electrodes 63 are made of non-magnetic, electrically conductive material, such as gold, so that they do not interfere with the magnetic field produced by the permanent magnet 57. These electrodes 63 are deposited on an insulating layer of silicon dioxide 64a and 64b lining the cavity 29**.

As an alternative to the permanent magnet 57, the magnetic field for the Wien filter can be generated by a magnetic film 65 deposited on the insulating silicon dioxide layers **64*a* and 64*b* on the top and bottom walls of the mass filter section 35 of the cavity 29 as shown in FIG. 5. In this embodiment, the electric field trimming electrodes 63 are deposited on an insulating layer of silicon dioxide 66*a* and 66*b* covering the magnetic film 65**.

Figure 6:
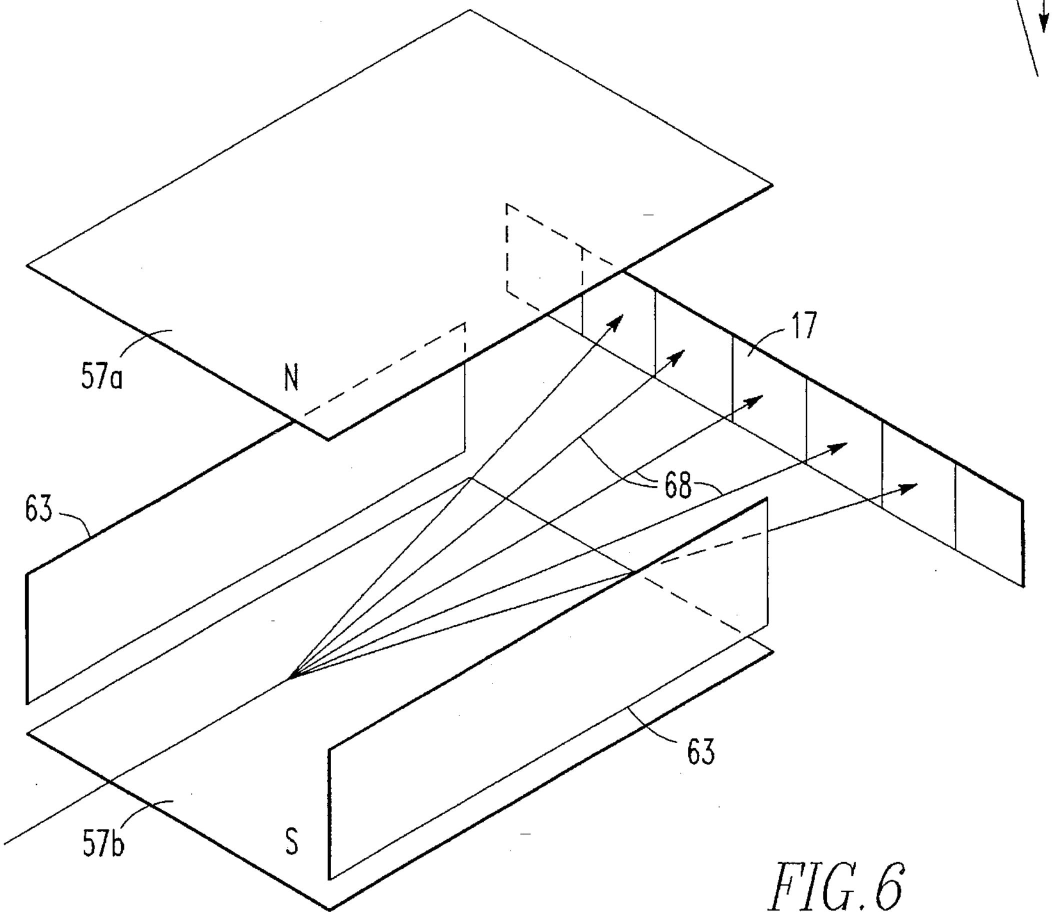
FIG. 6 is a schematic representation of the mass filter of FIGS. 4 and 5.

A second alternative Wien filter is shown in FIG. 6. In this schematic representation, the upper magnet pole face is removed for clarity while lower magnet pole face **57*b* is shown. The yoke of magnet 57 is provided outside the substrate of mass spectrometer 1. Opposed electrodes 63 and magnet pole faces 57 act upon the ion beam to produce a series of ion trajectories 66 which are received by detector array 17**.

The Wien filter is the preferred embodiment of the miniature mass filer 11. With permanent magnets **57*a* and 57*b*, the Wien filter offers a non-constant resolution which depends on magnetic field strength, ion energy and magnetic pole length. For 0.6 Tesla magnets 57 and a pole length of 7.5 and 10 millimeters, the resolution and mass window width is shown in FIG. 7. The mass window width is limited by the need to terminate cycloidal trajectories of ions with velocities much different than the undeflected ion as shown in FIG. 8. This analysis indicates that a electrostatic field plate width of 1500 micrometers is ideal and is the size of the Wien Filter. As shown in FIG. 8**, for an ion of mass to charge ratio of 50 being undeflected in a 0.6 Tesla field, ions of mass to charge ratios of 10 and 20 will fall very close in physical space to where ion of mass to charge ration of 50 would land if the filter were unrestrictive in Width. With a half-width of 750 micrometers, these ions would land and neutralize on the electrostatic field plate, thereby, not appearing at the end of the filter to be collected on the ion detector array.

Due to the ability to scan either the electric or magnetic fields, the Wien filter can be utilized over large mass ranges with practical resolutions. For atmospheric gas sensing, molecules under 650 amu molecular weight can be easily dispersed with a one centimeter long magnetic field with a magnetic field strength of greater than 0.4 Tesla. Higher magnetic fields are required to obtain resolutions of one amu at hundreds of amu.

Another embodiment of mass filter 11, known as the double-focussing filter 67 and shown in FIGS. **9*a* and 9*b***, separates ions according to their respective mass to charge ratios through the use of electrostatic and magnetic fields which act upon the same ion beam over different regions of the ions' flight path. This is commonly referred to as a double-focus mass spectrometer, whereas, both the magnetic sector and Wien filter are known as single focus mass spectrometers.

In the double-focussing filter 67, the electrostatic field is applied first in an electrostatic filer region analyzer section 69 and then the magnetic field is applied in a magnetic filter region 71. Constant electrostatic fields by themselves will not separate a monoenergetic beam according to its mass to charge ratio, unless the ion beam already possesses spatial dispersement of the ions according to mass to charge ratio. An electrostatic field separates ions according to their energies and then presents a focussed, monoenergetic beam to the magnetic field. This allows for higher resolutions, generally greater than 1 amu at 5000 amu. Two most commonly used double focussing mass spectrometers are shown schematically in FIGS. **9*a* and 9*b***.

The use of a separate electrostatic analyzer before the mass analyzer also has the advantage of utilizing ion sources which produce ions with a spectrum of energies, such as electrical discharges. The electrostatic analyzer presents an ion beam whose energies are of a narrow kinetic energy band. This placement of an electrostatic analyzer between the ion source and mass analyzer can also be used with the Wien filter or the magnetic analyzer.

The double-focussing filter is similar to the Wien filter discussed earlier, but requires the fabrication of curved electrodes or segmented electrodes to shape the electrostatic field to a curved pattern. Pole shaping is required for the magnetic field as well. Higher resolutions are possible with this arrangement, but the total length is essentially close to twice that required in the Wien filter. A detector array 73 is placed at the end of the magnetic filter region 71. Due to the need for precise shaping of the fields in order to achieve the high resolutions, the double-focussing filter 67 is more complicated than either the magnetic sector or the Wien filter to fabricate, but can be fabricated using micromachining techniques.

The miniaturization of the mass filter 11 requires the precise placement and sizing of the ion optical apertures with respect to the mass filter region 35. The ion optical apertures 9 determine the size of the ion beam 13 and the acceptance angle of the mass filter system 11. These determine the minimum spot size achievable at the detector region 37 and, therefore, the minimum displacement required to resolve two closely spaced peaks. Silicon micromachining allows the placement of micrometer size apertures precisely between the ionizer region 33 and the input to the mass filter 35. The use of a detector array 17 also requires that the ion optical control 9 occur before the mass filter 11.

For the present design, a ten micrometer wide aperture 9 is being used which translates to a beam width 13 of twenty micrometers at the detector 17. This means that the deflection required to resolve peaks is on the order of twenty micrometers, which for a one centimeter long magnetic field with strength greater than 0.4 Tesla can be easily achieved. Therefore, the combination of the small size of the ion optical aperture 9 and the precise placement of the aperture 9 with respect to the mass filter region 35 permits the fabrication of small mass spectrographs 1. The use of micromachining techniques makes this a practical device to be fabricated at low cost and high volume.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims in any and all equivalents thereof.

We claim:

1. A mass filter for use in a solid state mass spectrograph for analyzing a sample of gas, said mass filter being located in a mass filter section of a cavity provided in a semiconductor substrate, said mass filter generating an electromagnetic field in said cavity, said mass filter filtering by mass/charge ratio an ionized portion of said sample of gas generated by a gas ionizer, said mass filter including means for evacuating said mass filter.

2. The mass filter of claim 1 wherein said cavity further includes an ion optical aperture, wherein said ion optical aperture is provided between said gas ionizer and said mass filter, wherein a ten micrometer wide aperture is provided in said cavity to serve as said aperture.

3. The mass filter of claim 1 further comprising an inlet and a detector array provided generally perpendicular to said inlet wherein said electromagnetic field generated by said mass filter causes said ions to traverse a defined sector of a circular trajectory.

4. The mass filter of claim 3 wherein said mass filter further comprises a magnet pole face for generating said electromagnetic field, wherein said detector array is provided in a slanted relationship to said pole face.

5. The mass filter of claim 1 further comprising a permanent magnet provided in said substrate to produce a magnetic field perpendicular to the path of said ions.

6. The mass filter of claim 5 further comprising two pairs of electrodes, each electrode in each of said pair of electrodes being provided on opposing walls in said mass filter section of said cavity.

7. The mass filter of claim 1 further comprising a magnetic film provided on top and bottom walls of said mass filter section of said cavity and a pair of electrodes provided on top of said film, said magnetic film producing a magnetic field perpendicular to the path of said ions.

8. The mass filter of claim 1 further comprising a permanent magnet having its yoke provided outside of said substrate, said permanent magnet producing a magnetic field perpendicular to the path of said ions.

9. The mass filter of claim 1 further comprising an electrostatic analyzer provided between said gas ionizer and said mass filter.

10. The mass filter of claim 1 further comprising means for applying an electrostatic field to said ions and means for applying a magnetic field to said ions.

11. The mass filter of claim 10 wherein said means for applying an electrostatic field separates said ions according to their mass to charge ratio before said ions are acted upon by said magnetic field.

12. The mass filter of claim 11 further comprising a detector array provided at the end of said means for applying a magnetic field.

13. The mass filter of claim 1 further comprising a pair of trimming electrodes provided on opposite walls of said mass filter section of said cavity, said trimming electrodes formed during the fabrication of the mass spectrometer.

* * * * *